United States Patent
Sun et al.

(10) Patent No.: US 11,281,884 B2
(45) Date of Patent: Mar. 22, 2022

(54) UNDER-DISPLAY FINGERPRINT SENSING BASED ON OFF-AXIS ANGULAR LIGHT

(71) Applicant: Apple Inc., Cupertino, CA (US)

(72) Inventors: Ting Sun, Cupertino, CA (US); Mohammad Yeke Yazdandoost, San Jose, CA (US); Bosheng Zhang, Sunnyvale, CA (US); Marduke Yousefpor, San Jose, CA (US); Kathrin Berkner Cieslicki, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/002,365

(22) Filed: Aug. 25, 2020

(65) Prior Publication Data

US 2021/0081639 A1 Mar. 18, 2021

Related U.S. Application Data

(60) Provisional application No. 62/902,340, filed on Sep. 18, 2019.

(51) Int. Cl.
G06K 9/00 (2006.01)
(52) U.S. Cl.
CPC ....... G06K 9/0004 (2013.01); G06K 9/00046 (2013.01)
(58) Field of Classification Search
CPC .................................................. G06K 9/0004
See application file for complete search history.

(56) References Cited

U.S. PATENT DOCUMENTS

| | | | |
|---|---|---|---|
| 2014/0133715 A1 | 5/2014 | Ballard et al. | |
| 2019/0034690 A1* | 1/2019 | Jung | G06K 9/0008 |
| 2019/0067385 A1* | 2/2019 | Xu | H01L 27/3244 |
| 2020/0380236 A1* | 12/2020 | He | G06F 3/044 |

FOREIGN PATENT DOCUMENTS

| | | |
|---|---|---|
| CN | 107580709 | 1/2018 |
| CN | 109074495 | 12/2018 |
| CN | 109154869 | 1/2019 |
| CN | 109791599 | 5/2019 |
| CN | 109948410 | 6/2019 |

OTHER PUBLICATIONS

Chinese Office Action from Chinese Patent Application No. 202021867168.X, dated Aug. 18, 2021, 18 pages including English language translation.

* cited by examiner

*Primary Examiner* — Joseph R Haley
(74) *Attorney, Agent, or Firm* — Morgan, Lewis & Bockius LLP

(57) ABSTRACT

An apparatus for touch-sensing includes a light-emitting layer covered by a transparent layer and configured to illuminate a surface touching the transparent layer and to allow transmission of reflected light rays from the surface to underlying layers. The underlying layers include an optical coupling layer, a collimator layer and a pixelated image sensor. The optical coupling layer bends the reflected light rays to create oblique light rays. The collimator layer includes a number of apertures to collimate the received light rays. The pixelated image sensor senses the collimated oblique light rays.

19 Claims, 6 Drawing Sheets

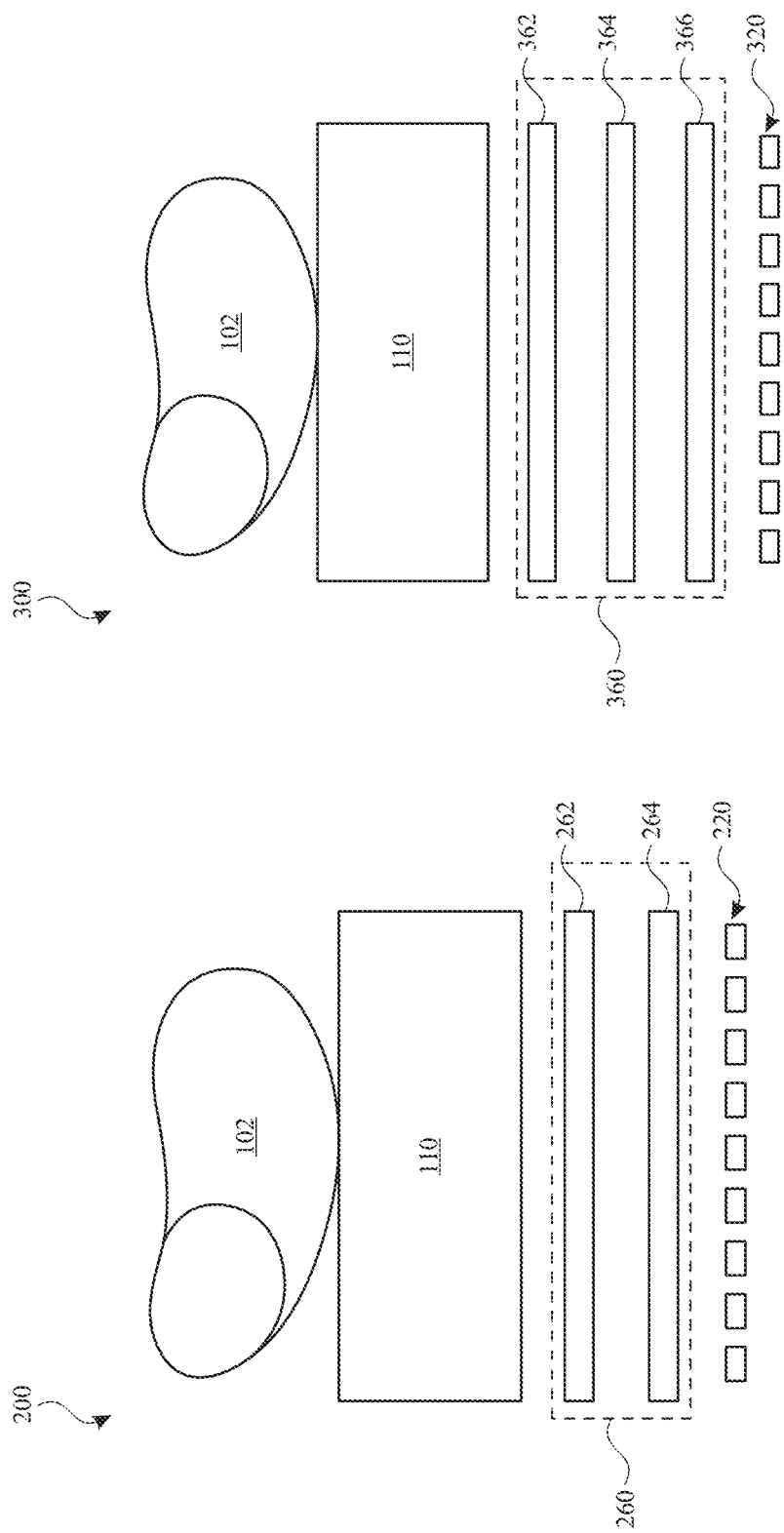

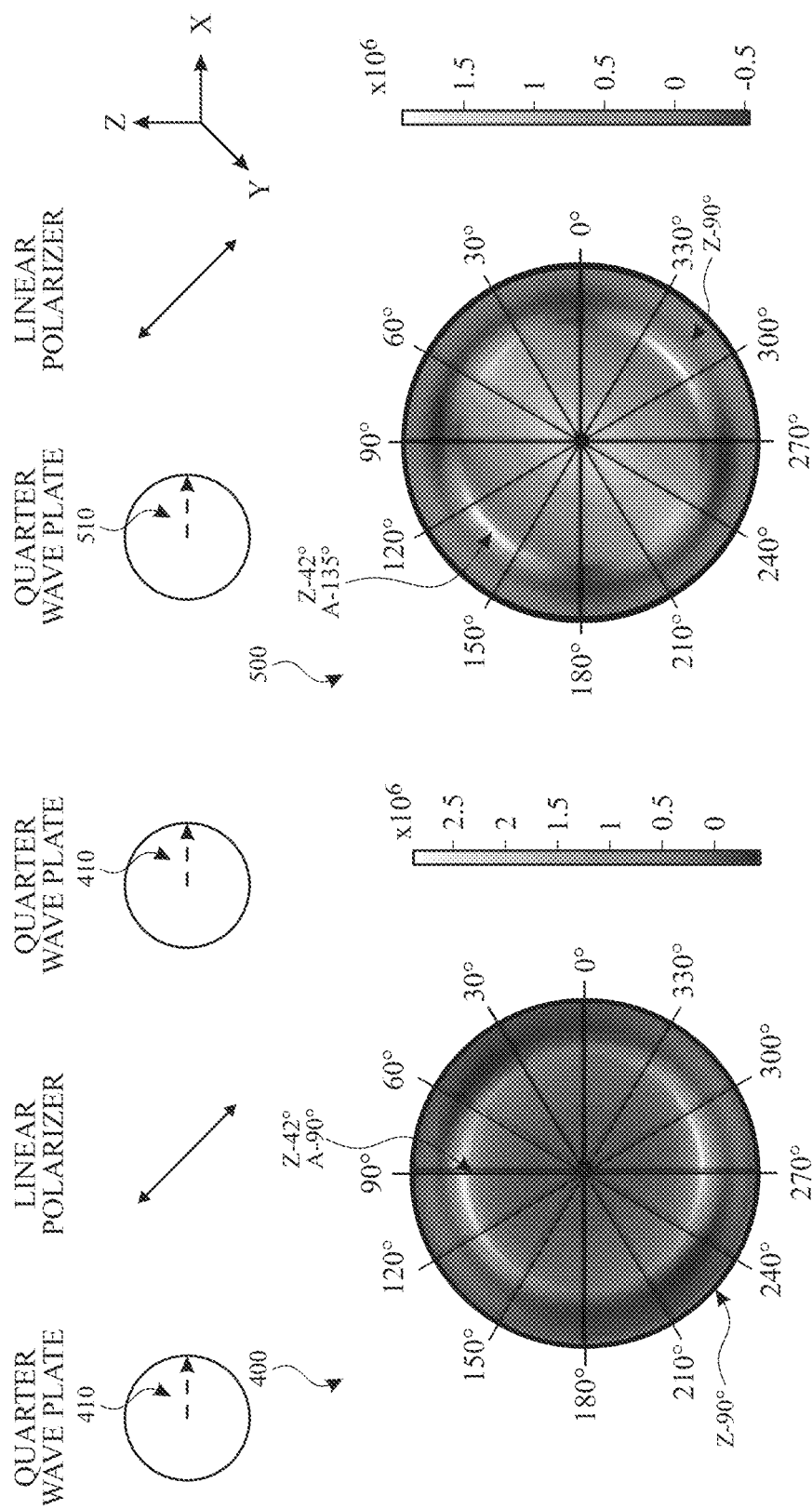

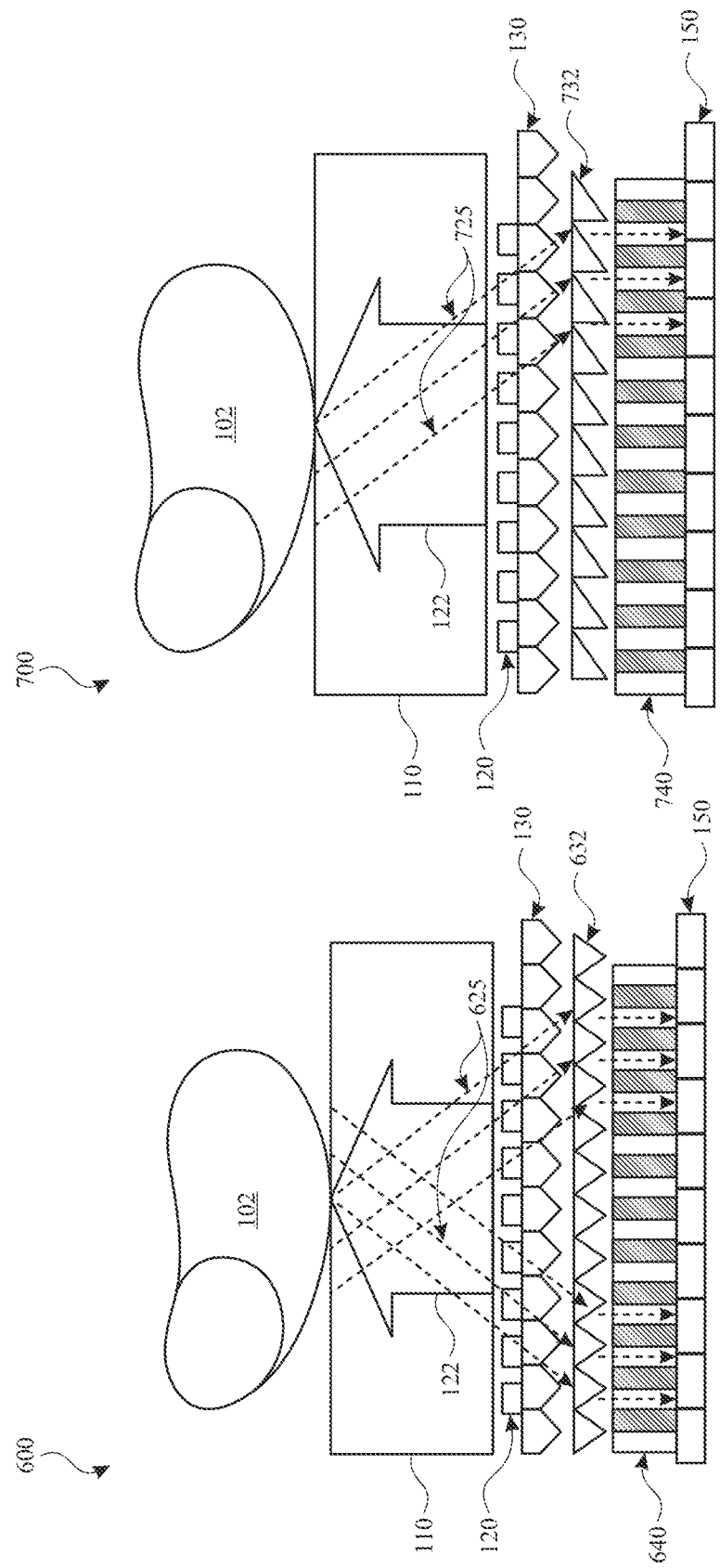

US 11,281,884 B2

UNDER-DISPLAY FINGERPRINT SENSING BASED ON OFF-AXIS ANGULAR LIGHT

CROSS-REFERENCES TO RELATED APPLICATIONS

This application claims priority to and the benefit of U.S. Provisional Patent Application No. 62/902,340, filed Sep. 18, 2019, which is hereby incorporated by reference in its entirety.

TECHNICAL FIELD

The present description relates generally to sensor technology and, more particularly, to an enhanced under-display fingerprint sensing based on off-axis angular light.

BACKGROUND

Fingerprint sensing and matching is widely used as a reliable technique for personal identification or verification. In particular, a common approach to fingerprint identification involves scanning a sample fingerprint of a person to form an image and storing the image as a unique characteristic of the person. The characteristics of the sample fingerprint may be compared to information associated with reference fingerprints already stored in a database to determine proper identification of the person, such as for verification purposes.

An optical fingerprint-sensing device may be particularly advantageous for verification and/or authentication in an electronic device and, more particularly, a portable device, for example, a portable communication device. The optical fingerprint-sensing device may be carried by the housing of a portable communication device, for example, and may be sized to sense a fingerprint from a single finger. Where an optical fingerprint-sensing device is integrated into an electronic device or host device, as noted above, the authentication can be performed quickly, for example, by a processor of the host device.

Compact imaging systems including optical fingerprint-sensing devices can use angular filters, such as a collimator pipe array or microlens array with an aperture mask near the back focal plane. For certain objects, oblique light forms stronger imaging signals than light that is normal to the imaging plane. For example, a fingerprint-sensing system/device with multidirectional illumination, such as an under-display fingerprint-sensing device may utilize oblique angular filters to capture the stronger signals to enhance image contrast.

BRIEF DESCRIPTION OF THE DRAWINGS

Certain features of the subject technology are set forth in the appended claims. However, for purposes of explanation, several embodiments of the subject technology are set forth in the following figures.

FIG. 2 is a diagram illustrating an example of an under-display optical fingerprint-sensing device including two polarizer layers, in accordance with one or more aspects of the subject technology.

FIG. 3 is a diagram illustrating an example of an under-display optical fingerprint-sensing device including three polarizer layers, in accordance with one or more aspects of the subject technology.

FIG. 4 is a diagram illustrating an example of a simulated angular distribution of light intensity corresponding to the three polarizer layers of FIG. 3, in accordance with one or more aspects of the subject technology.

FIG. 5 is a diagram illustrating an example of a simulated angular distribution of light intensity corresponding to the two polarizer layers of FIG. 2, in accordance with one or more aspects of the subject technology.

FIG. 6 is a diagram illustrating an example of an under-display optical fingerprint-sensing device based on off-axis angular light including blazed gratings, in accordance with one or more aspects of the subject technology.

FIG. 7 is a diagram illustrating an example of an under-display optical fingerprint-sensing device based on off-axis angular light including single-sided blazed gratings, in accordance with one or more aspects of the subject technology.

DETAILED DESCRIPTION

Figure 1:
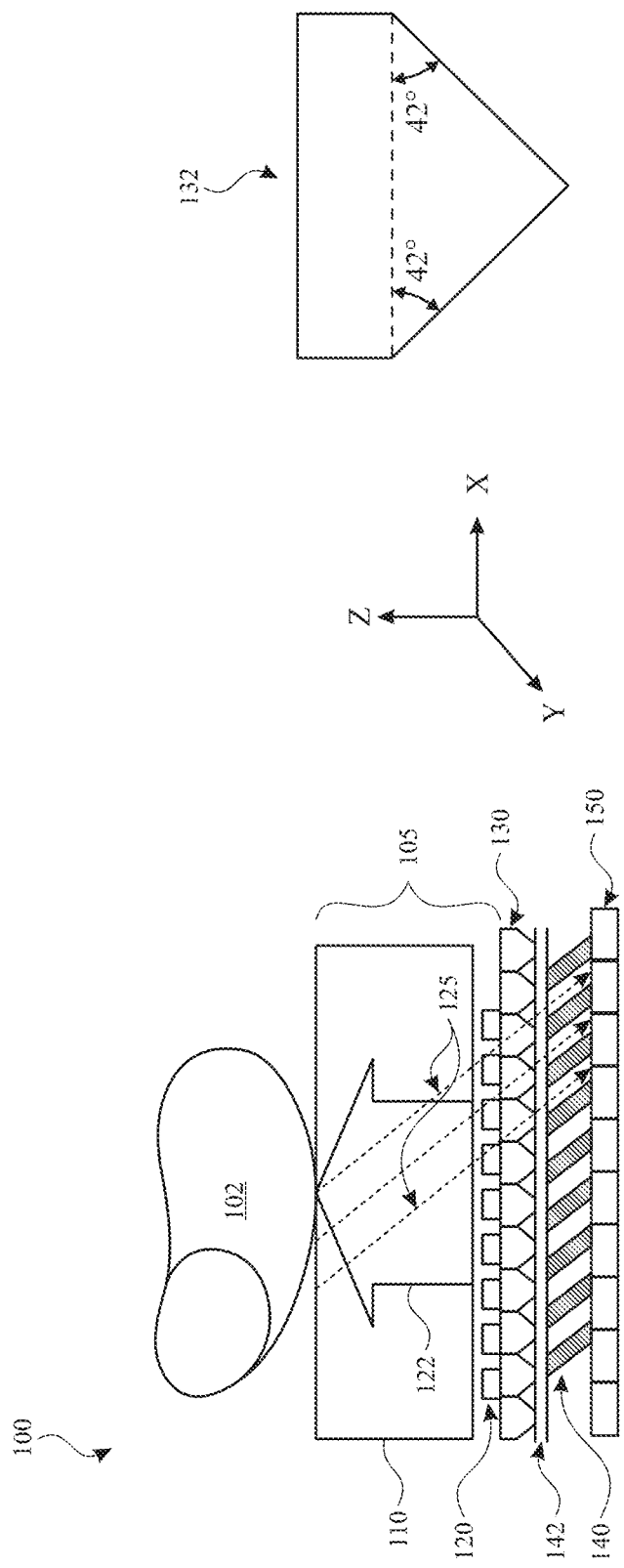
FIG. 1 is a diagram illustrating an example of an under-display optical fingerprint-sensing device based on off-axis angular light, in accordance with one or more aspects of the subject technology.

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

In an under-display fingerprint-sending system, the display consists of active red-green-blue (RGB) pixels that emit light and illuminate the finger placed on top of the display. The light reflected from the finger passes through the openings between the display pixels and is captured by the sensor beneath the display. The contact and noncontact regions between the finger skin and the display's glass plate generate different light intensity, which thus forms the ridge-valley contrast of the fingerprint. Due to the low-light throughput and diffraction caused by the display stack, the fingerprint image may suffer from low contrast and low signal-to-noise ratio (SNR). To overcome this problem, the subject disclosure provides a method to capture the off-axis angular light from the finger by insertion of angle-dependent filtering options between the display and the sensor. This method can improve the contrast of fingerprint impressions and maintain the compactness of the entire sensing system.

In some aspects, the subject technology is directed to an apparatus for under-display fingerprint sensing based on off-axis angular light. The apparatus includes a light-emitting layer, an optical coupling layer, a collimator layer and a pixelated image sensor. The light-emitting layer is covered by a transparent layer and illuminates the surface touching the transparent layer and allows transmission of reflected light rays from the surface to underlying layers including the optical coupling layer, the collimator layer and the pixelated image sensor. The optical coupling layer directs the reflected light rays at an angle to the collimator layer, which includes a number of apertures and can collimate the directed reflected light rays. The pixelated image sensor can sense collimated light rays.

In one or more implementations, the optical coupling layer is an optical layer made of a planar array of Fresnel prisms. The apparatus further includes a polarizer, including a linear polarizer and one or more circular polarizers. The angle at which the optical coupling layer directs the reflected light rays is about 42° with respect to the normal to the plane of the optical coupling layer. The collimator layer can be a tilted collimator with aperture walls at nearly 42° with respect to the normal to the plane of the optical coupling layer.

In some implementations, the collimator layer is a nontilted collimator, and the apparatus further includes an optical bending layer configured to bend the directed reflected light rays prior to reaching the nontilted collimator. The optical bending layer can be a planar array of blazed gratings. In one or more implementations, optical bending layer can be a holographic layer.

FIG. 1 is a diagram illustrating an example of an under-display optical fingerprint-sensing device 100 based on off-axis angular light, in accordance with one or more aspects of the subject technology. The under-display optical fingerprint-sensing device 100 (hereinafter "fingerprint-sensing device 100") includes a display stack 105 consisting of a transparent layer (e.g., glass) 110 and a light-emitting layer 120, an optical coupling layer 130, an air gap 142, a collimator layer 140 and an image sensor layer 150 (hereinafter "image sensor 150"). The light-emitting layer 120 can be an organic light-emitting diode (OLED) display. The optical coupling layer 130 is an optical coupling layer containing an optical layer made of a grating including a periodic structure of Fresnel prisms 132. Each of the Fresnel prisms 132 is formed of a wedge-shaped prism with a wedge angle of about 42°, as shown in FIG. 1. The collimator layer 140 is separated from the optical coupling layer 130 by an air gap 142 with a thickness of a few tens of microns. The collimator layer 140 is a tilted collimator with aperture walls at nearly 42° with respect to the normal (Z direction) to the plane of the optical coupling layer 130 (X-Y plane). The image sensor 150 is a pixelated imager sensor such as a thin-film transistor (TFT)-based organic imager. The display stack can include polarizer layers (not shown for simplicity in FIG. 1) that will be discussed later in the present disclosure.

The optical coupling layer 130 and the collimator layer 140 together function as an angle-dependent filter and are introduced by the subject technology to achieve higher quality fingerprint images with higher contrast, as explained herein. The light-emitting layer 120 includes active RGB pixels and emits a light beam 122 that provides a uniform flood illumination of a finger 102 placed on top of the display stack 105. Light reflected from the finger 102 passes through the openings between the display pixels of the light-emitting layer 120, is processed by the angle-dependent filtering performed by the optical coupling layer 130 and the collimator layer 140 and is captured by the image sensor 150.

The contact regions (ridges) and noncontact regions (valleys) between the skin of the finger 102 and the glass 110 generate different light intensity that forms the ridge-valley contrast of the fingerprint image captured by the image sensor 150. Due to the low-light throughput and diffraction caused by the display stack 105, the fingerprint images produced by existing non-angular imagers suffer from a low contrast and a low SNR. To overcome this shortcoming, the subject technology introduces the angle-dependent filtering implemented by the optical coupling layer 130 and the collimator layer 140 to capture the off-axis angular light rays 125 from the finger 102. This can improve the contrast of fingerprint impressions and maintain the compactness of the entire fingerprint-sensing device 100.

Although the ridge region of the finger 102 is in contact with the glass 110, in the valley region, the volume between the finger skin and the glass 110 contains an air gap. When the pixels of the light-emitting layer 120 are turned on, the light beam 122 will illuminate the finger 102 from different angles. If the incidence angle is beyond a critical angle, which is about 42° for incidence from glass to air in the visible spectrum, light is fully reflected back into the glass 110. However, because the finger skin and the glass have a very close refractive index, in the ridge region, the light will be absorbed and scattered by skin layers. The intensities of light reflectance in the ridge and valley regions are both angle-dependent. To image the finger 102 on the imager sensor 150 with smaller spatial cross-talk, the angle-dependent filtering is used to limit the photon-acceptance angle. The angle-dependent filtering of the subject technology, as implemented by the optical coupling layer 130 and the collimator layer 140, absorbs and blocks the light that strikes the collimator at normal angles. Only the oblique light rays arriving at an angle of about 42° can reach to the image sensor 150 and be included in the fingerprint image. The oblique light forms stronger imaging signals than light that is normal to the imaging plane. The fingerprint-sensing device 100 that utilizes oblique angular filters can capture stronger signals to enhance the fingerprint image contrast.

FIG. 2 is a diagram illustrating an example of an under-display optical fingerprint-sensing device 200 including two polarizer layers, in accordance with one or more aspects of the subject technology. In some implementations, as shown in FIG. 2, the display stack of the optical fingerprint-sensing device 200 (hereinafter "fingerprint-sensing device 200") includes the glass 110, a polarizer 260, and an OLED display 220. The polarizer 260 is placed between the glass 110 and the OLED display 220. The polarizer 260 includes a linear polarizer 262 and a quarter-wave plate 264. The polarizer 260 changes the light polarization states to enhance contrast ratio by reducing or eliminating the internally reflected ambient light from entering users' eyes. The emissive light from the OLED display 220 is linearly polarized by the linear polarizer 262. The ambient light is also linearly polarized by the linear polarizer 262, and then becomes circularly polarized after passing the quarter-wave plate 264. After internal reflection and passing through the quarter-wave plate 264 again, the ambient light becomes linearly polarized in the direction which is perpendicular to the transmission axis of the linear polarizer 262 and thus be stopped by the linear polarizer 262. When the finger 102 is illuminated by the emissive light from the OLED display 220, the degree of polarization changes based on the incident angle and whether the skin is in contact with the glass 110. Therefore, the contrast of the image on the image sensor (e.g., 150 of FIG. 1) is strongly affected by the polarization configuration of the display stack.

FIG. 3 is a diagram illustrating an example of an under-display optical fingerprint-sensing device 300 including three polarizer layers, in accordance with one or more aspects of the subject technology. In one or more implementations, as shown in FIG. 3, the display stack of the optical fingerprint-sensing device 300 (hereinafter "fingerprint-sensing device 300") includes the glass 110, a polarizer 360, and an OLED display 320. The polarizer 360 is placed between the glass 110 and the OLED display 320. The polarizer 360 includes a first quarter-wave plate 362, a linear polarizer 364 and a second quarter-wave plate 366. The polarizer 360 changes the light polarization states to enhance the contrast ratio by reducing or eliminating the internally reflected ambient light from entering users' eyes. And, by adding an additional quarter-wave plate 362 on top of the linear polarizer 364, the emissive light from the OLED display 320 becomes circularly polarized to achieve sunglass-friendly compliance. When the finger 102 is illuminated by the emissive light from the OLED display 320, the degree of polarization changes based on the incident angle and whether the skin is in contact with the glass 110. The contrast of the image on the image sensor (e.g., 150 of FIG. 1) is strongly affected by the polarization configuration of the display stack.

FIG. 4 is a diagram illustrating an example of a simulated angular distribution 400 of light intensity corresponding to the three polarizer layers of FIG. 3, in accordance with one or more aspects of the subject technology. The simulated angular distribution 400 corresponds to the light intensity difference between the ridge and valley regions of the finger 102 of FIG. 3. In the three-layer polarizer structure of FIG. 3, the fast axis 410 of the quarter wave plates 362 and 364 is on the x-axis. The linear polarizer is 45° rotated as shown in FIG. 4. The simulated angular distribution 400 of intensity difference, calculated and plotted in FIG. 4, is a projected spherical coordinate system. The circles show zenith angles starting from 0° in the middle to 90° on the edge (Z-90°). The azimuth angle moving counter-clockwise ranges from 0° to 360°. From the plot of the simulated angular distribution 400, a peak intensity is observed at about a 42° zenith and 90° azimuth angle (Z-42°; A-90°). This indicates that the light that strikes the collimator layer (e.g., 140 of FIG. 1) at an oblique angle (e.g., about 42°) can result in a substantially higher contrast to fingerprint image regardless of the polarization state.

FIG. 5 is a diagram illustrating an example of a simulated angular distribution 500 of light intensity corresponding to the two polarizer layers of FIG. 2, in accordance with one or more aspects of the subject technology. The simulated angular distribution 500 corresponds to the light intensity difference between the ridge and valley regions of the finger 102 of FIG. 2. In the two-layer polarizer structure of FIG. 2, the fast axis 510 of the quarter wave plate 262 is on the x-axis. The simulated linear polarizer is 45° rotated as shown in FIG. 5. The angular distribution 500 of intensity difference, calculated and plotted in FIG. 5, is similar to the simulated angular distribution 400 of FIG. 4, and shows a peak intensity at about a 42° zenith and 135° azimuth angle (Z-42°; A-135°). As explained with respect to FIG. 4, this indicates that the light that strikes the collimator layer (e.g., 140 of FIG. 1) at an oblique angle (e.g., about 42°) can result in a substantially higher contrast to fingerprint image regardless of the polarization state.

FIG. 6 is a diagram illustrating an example of an under-display optical fingerprint-sensing device 600 based on off-axis angular light including blazed gratings, in accordance with one or more aspects of the subject technology. The under-display optical fingerprint-sensing device 600 (hereinafter "fingerprint-sensing device 600") includes the glass 110, the light-emitting layer (e.g., OLED display) 120, the optical coupling layer 130 and an image senor 150, as discussed above with respect to FIG. 1, as well as a blazed grating layer 632 and a collimator layer 640. The difference between the fingerprint-sensing device 600 and fingerprint-sensing device 100 of FIG. 1 resides in the addition of the blazed grating layer 632 and different configuration of the collimator layer 640. The blazed grating layer 632 is an optical bending layer that can bend the oblique reflected rays 625 resulting from illumination of the finger 102 by the uniform flood light beam 122 from the OLED display 120. The blazed grating layer 632 changes the oblique angle (e.g., about 42°) of the oblique reflected rays 625 into 0°. The 0° rays produced by the blazed grating layer 632 can readily pass through apertures of the collimator layer 640 that is a normal-angle (nontiled) aperture collimator. In some implementations, the collimator layer 640 can be a micro-aperture plate or a fiber-optics plate, and can provide a narrow field-of-view (FOV) within a range of about +/−0.5° to +/−10°.

One of the characteristics of the configuration of the fingerprint-sensing device 600 is that it can produce a shifted overlaid image of the fingerprint under simple uniform flood illumination (e.g., of the light beam 122). This characteristic can be exploited by using a spatially nonuniform source with a different spatial pattern at multiple scans to both improve temporal image noise and resolve each pixel of fingerprint uniquely. There are a wide variety of spatial non-uniform illumination patterns that are strongly noncorrelated or orthogonal, such as Hadamard and pseudorandom illumination patterns. Alternatively, two images can be separated from the overlaid image by solving linear equations. Near the left and right boundaries of the finger in FIG. 6, only one direction of light is collected by the sensor and there is no overlap; one gets the fingerprint image without the need to separate. In the middle, overlap happens since each sensor pixel receives light from two positions of the finger. Near the non-overlapping region, one of these two positions lie in the non-overlapping area and can thus be subtracted out to solve intensity at the other position that is in the overlapping region. One can repeat this procedure and propagate the information from the non-overlapping area to the middle overlapping area. After two individual images corresponding to two perspectives of the finger are solved, one can combine to improve the signal-to-noise ratio.

FIG. 7 is a diagram illustrating an example of an under-display optical fingerprint-sensing device 700 based on off-axis angular light including single-sided blazed grating, in accordance with one or more aspects of the subject technology. The under-display optical fingerprint-sensing device 700 (hereinafter "fingerprint-sensing device 700") includes the glass 110, the light-emitting layer (e.g., OLED display) 120, the optical coupling layer 130 and an image sensor 150, as discussed above with respect to FIG. 1, as well as a blazed grating layer 732 and a collimator layer 740. The difference between the fingerprint-sensing device 700 and fingerprint-sensing device 600 of FIG. 6 resides in the blazed grating layer 732 that is a single-sided blazed grating. The blazed grating layer 632 is an optical bending layer that can bend the oblique reflected rays 625 resulting from illumination of the finger 102 by the uniform flood light beam 122 from the OLED display 120. The single-sided blazed grating layer 732 changes the oblique angle (e.g., about 42°) of the oblique reflected rays 725 into 0°. The 0° rays produced by the blazed grating layer 732 can readily pass through apertures of the collimator layer 740 that is a normal-angle (nontiled) aperture collimator. In some implementations, the collimator layer 740 can be a micro-aperture plate or a fiber-optics plate, and can provide a narrow FOV within a range of about +/−0.5° to +/−10°. The single-sided blazed grating layer 732 functions similarly to the blazed grating layer 632 of FIG. 6, but cannot produce a shifted overlaid image of the fingerprint under simple uniform flood illumination, as the blazed grating layer 632.

Figure 8:
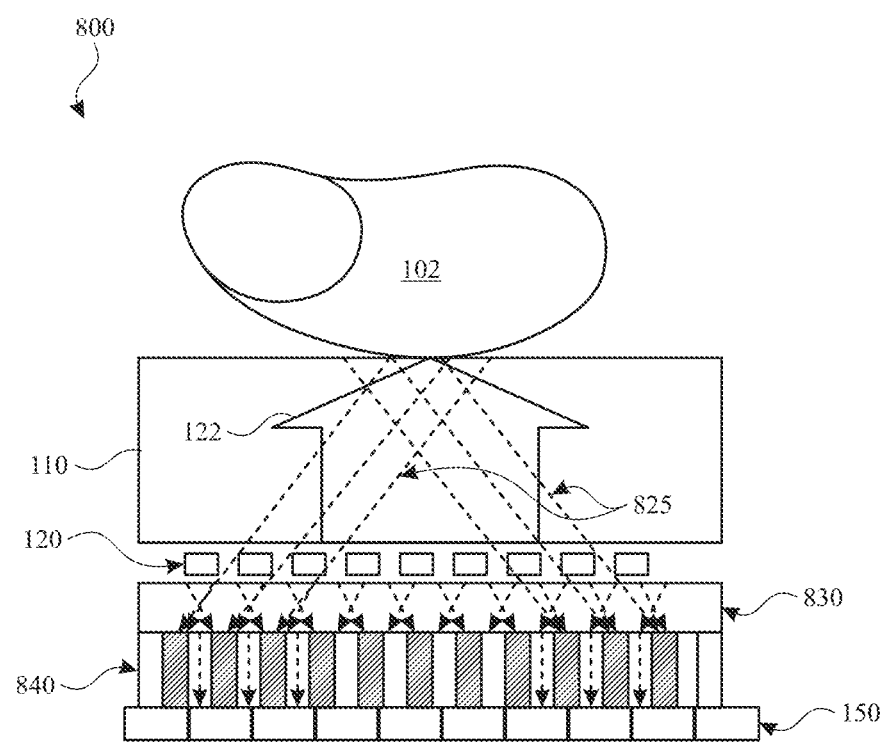
FIG. 8 is a diagram illustrating an example of an under-display optical fingerprint-sensing device based on off-axis angular light including holographic gratings, in accordance with one or more aspects of the subject technology.

FIG. 8 is a diagram illustrating an example of an under-display optical fingerprint-sensing device 800 based on off-axis angular light including holographic gratings, in accordance with one or more aspects of the subject technology. The under-display optical fingerprint-sensing device 800 (hereinafter "fingerprint-sensing device 800") includes the glass 110, the light-emitting layer (e.g., OLED display) 120 and the image sensor 150, as discussed above with respect to FIG. 1, as well as a holographic grating layer 830 and a collimator layer 840. The difference between the fingerprint-sensing device 800 and fingerprint-sensing device 600 of FIG. 6 is that the optical coupling layer 130 and the blazed grating layer 632 of FIG. 6 are replaced by the holographic grating layer 830. The holographic grating layer 830 changes the oblique angle (e.g., about 42°) of the oblique reflected rays 825 into 0°. The 0° rays produced by the holographic grating layer 830 can readily pass through apertures of the collimator layer 840 that is a normal-angle (nontiled) aperture collimator. In some implementations, the collimator layer 840 can be a micro-aperture plate or a fiber-optics plate, and can provide a narrow FOV within a range of about +/−0.5° to +/−10°. The holographic grating layer 830 can be formed of a volume of thin layer materials with a modulated refractive index.

One of the characteristics of the configuration of the fingerprint-sensing device 800 is that it can produce a shifted overlaid image of the fingerprint under simple uniform flood illumination (e.g., of the light beam 122). As explained above with respect to FIG. 6, this characteristic can be exploited by using a spatially nonuniform source with a different spatial pattern at multiple scans or solving linear equations to get two separate images to combine to both improve temporal image noise and resolve each pixel of fingerprint uniquely.

Figure 9:
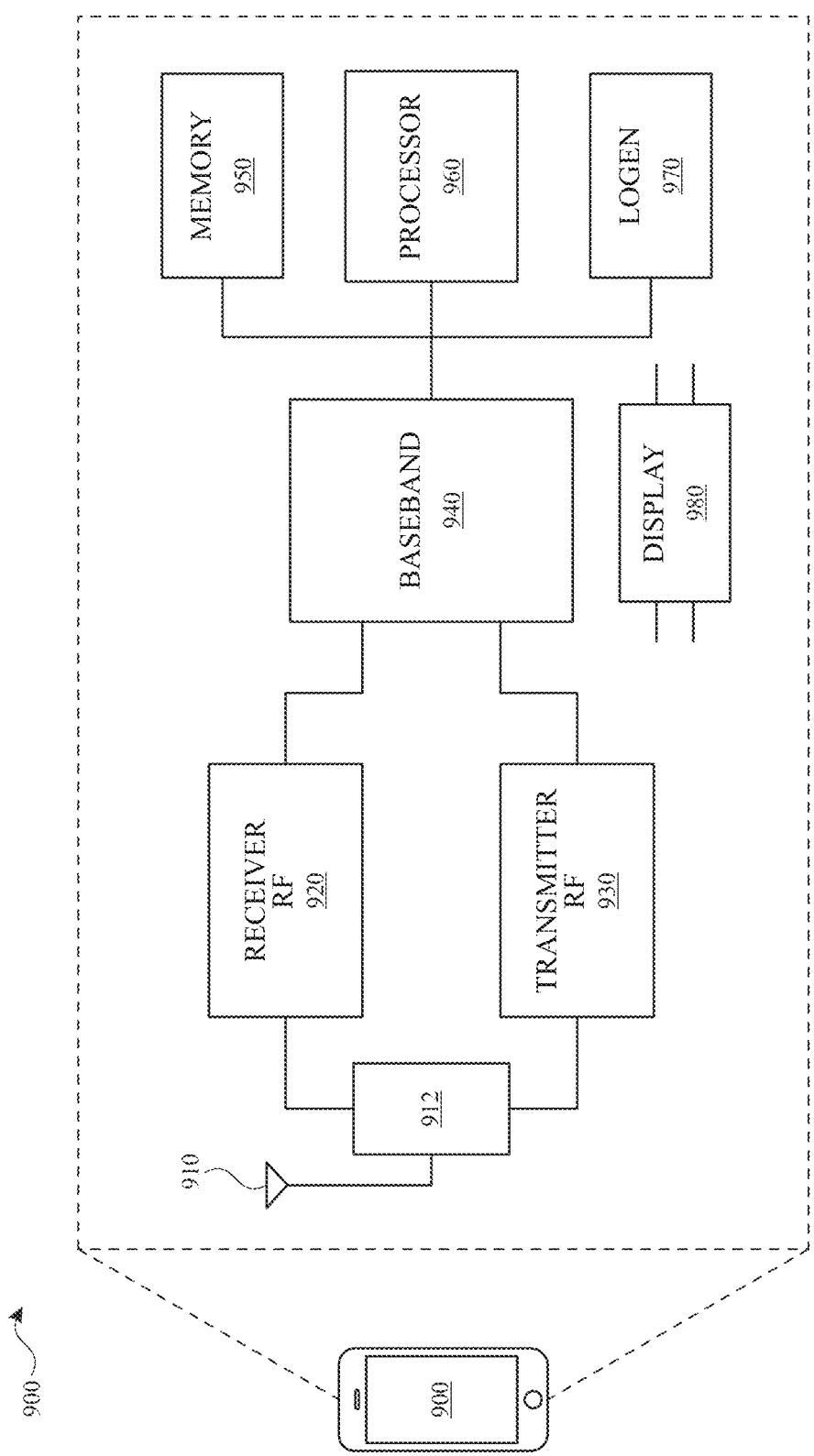
FIG. 9 is a block diagram illustrating a wireless communication device, within which one or more aspects of the subject technology can be implemented.

FIG. 9 is a block diagram illustrating a wireless communication device 900, within which one or more aspects of the subject technology can be implemented. In one or more implementations, the wireless communication device 900 can be a smartphone or a smartwatch that hosts an apparatus of the subject technology including an under-display optical fingerprint-sensing device with angle-focused filters. The wireless communication device 900 may comprise a radio-frequency (RF) antenna 910, a duplexer 912, a receiver 920, a transmitter 930, a baseband-processing module 940, a memory 950, a processor 960, a local oscillator generator (LOGEN) 970, and a display 980. In various embodiments of the subject technology, one or more of the blocks represented in FIG. 9 may be integrated on one or more semiconductor substrates. For example, the blocks 920-970 may be realized in a single chip or a single system on a chip, or may be realized in a multichip chipset.

The receiver 920 may comprise suitable logic circuitry and/or code that may be operable to receive and process signals from the RF antenna 910. The receiver 920 may, for example, be operable to amplify and/or down-convert received wireless signals. In various embodiments of the subject technology, the receiver 920 may be operable to cancel noise in received signals and may be linear over a wide range of frequencies. In this manner, the receiver 920 may be suitable for receiving signals in accordance with a variety of wireless standards, such as Wi-Fi, WiMAX, Bluetooth, and various cellular standards. In various embodiments of the subject technology, the receiver 920 may not use any saw-tooth acoustic wave (SAW) filters and few or no off-chip discrete components such as large capacitors and inductors.

The transmitter 930 may comprise suitable logic circuitry and/or code that may be operable to process and transmit signals from the RF antenna 910. The transmitter 930 may, for example, be operable to up-convert baseband signals to RF signals and amplify RF signals. In various embodiments of the subject technology, the transmitter 930 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 930 may be operable to provide signals for further amplification by one or more power amplifiers.

The duplexer 912 may provide isolation in the transmit band to avoid saturation of the receiver 920 or damaging parts of the receiver 920, and to relax one or more design requirements of the receiver 920. Furthermore, the duplexer 912 may attenuate the noise in the receive band. The duplexer 912 may be operable in multiple frequency bands of various wireless standards.

The baseband-processing module 940 may comprise suitable logic, circuitry, interfaces, and/or code that may be operable to perform processing of baseband signals. The baseband-processing module 940 may, for example, analyze received signals and generate control and/or feedback signals for configuring various components of the wireless communication device 900, such as the receiver 920. The baseband-processing module 940 may be operable to encode, decode, transcode, modulate, demodulate, encrypt, decrypt, scramble, descramble, and/or otherwise process data in accordance with one or more wireless standards.

The processor 960 may comprise suitable logic, circuitry, and/or code that may enable processing data and/or controlling operations of the wireless communication device 900. In this regard, the processor 960 may be enabled to provide control signals to various other portions of the wireless communication device 900. The processor 960 may also control the transfer of data between or among various portions of the wireless communication device 900. Additionally, the processor 960 may enable implementation of an operating system or otherwise execute code to manage the operations of the wireless communication device 900. In one or more implementations, the processor 960 can be used to process signals of the under-display fingerprint-sensing device of the subject technology (e.g., signals from the image sensor 150 of FIG. 1) to generate a fingerprint image and compare the fingerprint image with a number of reference fingerprints stored in a database to identify and/or authenticate a person associated with the fingerprint or to detect a two-dimensional spoof.

The memory 950 may comprise suitable logic, circuitry, and/or code that may enable storage of various types of information such as received data, generated data, code, and/or configuration information. The memory 950 may comprise, for example, RAM, ROM, flash, and/or magnetic storage. In various embodiments of the subject technology, information stored in the memory 950 may be utilized for configuring the receiver 920 and/or the baseband-processing module 940. In some implementations, the memory 950 may store image information from processed and/or unprocessed fingerprint images of the under-display fingerprint-sensing device of the subject technology. The memory 950 may also include one or more databases of reference fingerprints that can be used to identify and/or authenticate a person associated with the fingerprint.

The LOGEN 970 may comprise suitable logic, circuitry, interfaces, and/or code that may be operable to generate one or more oscillating signals of one or more frequencies. The LOGEN 970 may be operable to generate digital and/or analog signals. In this manner, the LOGEN 970 may be operable to generate one or more clock signals and/or sinusoidal signals. Characteristics of the oscillating signals such as the frequency and duty cycle may be determined based on one or more control signals from, for example, the processor 960 and/or the baseband-processing module 940.

In operation, the processor 960 may configure the various components of the wireless communication device 900 based on a wireless standard according to which it is desired to receive signals. Wireless signals may be received via the RF antenna 910, amplified, and down-converted by the receiver 920. The baseband-processing module 940 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 950, and/or information affecting and/or enabling operation of the wireless communication device 900. The baseband-processing module 940 may modulate, encode, and perform other processing on audio, video, and/or control signals to be transmitted by the transmitter 930 in accordance with various wireless standards.

In one or more implementations, the display 980 may include the under-display fingerprint-sensing device of the subject technology (e.g., 100 of FIG. 1, 600 of FIG. 6, 700 of FIG. 7 or 800 of FIG. 8). The under-display optical fingerprint-sensing device of the subject technology can be readily integrated into the wireless communication device 900, in particular, when the wireless communication device 900 is a smartphone or a smartwatch.

In one or more aspects, an apparatus of the subject for touch sensing includes a light-emitting layer covered by a transparent layer and configured to illuminate a surface touching the transparent layer and to allow transmission of reflected light rays from the surface to underlying layers. The underlying layers include an optical coupling layer, a collimator layer and a pixelated image sensor. The optical coupling layer bends the reflected light rays to create oblique light rays. The collimator layer includes a number of apertures to collimate the received light rays. The pixelated image sensor senses the collimated oblique light rays.

In other aspects, a communication device includes a processor and an angle-focused touch-sensing apparatus consisting of a light-emitting layer covered by a transparent layer and configured to illuminate a surface touching the transparent layer and to allow transmission of a reflected light from the surface to underlying layers. The underlying layers include a grating layer, a collimator layer and a pixelated image sensor. The grating layer bends the reflected light to create oblique light, and the collimator layer, including a number of apertures, can spatially process received light. The pixelated image sensor senses the spatially processed light.

In yet other aspects, an angle-focused touch-sensing apparatus includes a touch-display layer such as an OLED display configured to emit light to illuminate a touching surface and to transmit reflected light from the touching surface for sensing. An optical grating layer bends the reflected light to create oblique light rays. In some implementations, the optical grating layer includes Fresnel prisms. An optical layer, including blazed gratings, rebinds the oblique light rays into straight light rays. A collimator layer collimates the straight light rays, and a pixelated image sensor senses the collimated light rays.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter genders (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus for touch sensing, the apparatus comprising:
   a light-emitting layer covered by a transparent layer and configured to illuminate a surface touching the transparent layer and to allow transmission of reflected light rays from the surface to underlying layers including:
   an optical coupling layer configured to diffract the reflected light rays to create oblique light rays;
   an optical bending layer configured to bend the oblique light rays;
   a collimator layer including a plurality of apertures and configured to collimate light rays received from the optical bending layer, wherein the collimator layer comprises a nontilted collimator; and
   a pixelated image sensor configured to sense collimated oblique light rays.

2. The apparatus of claim 1, wherein the optical coupling layer comprises an optical layer made of a grating including a periodic structure of Fresnel prisms.

3. The apparatus of claim 2, further comprising a polarizer including a linear polarizer and one or more circular polarizers.

4. The apparatus of claim 3, wherein the oblique light rays are bent at an angle of about 42° with respect to a normal to a plane of the optical coupling layer.

5. The apparatus of claim 1, wherein a collimator axis of the nontilted collimator is substantially perpendicular to the collimator layer.

6. The apparatus of claim 1, wherein the optical bending layer comprises a planar array of blazed gratings.

7. The apparatus of claim 1, wherein the optical bending layer comprises a holographic grating layer formed of a volume of thin layer materials with modulated refractive index.

8. The apparatus of claim 1, wherein the light-emitting layer is configured to generate a uniform flood illumination, and wherein the light-emitting layer comprises an organic light-emitting diode (OLED) display.

9. The apparatus of claim 1, wherein the light-emitting layer comprises a non-uniform illumination source configurable to generate different spatial patterns for different scans of the surface touching the transparent layer.

10. The apparatus of claim 1, wherein the collimator layer comprises one of a micro-aperture plate or a fiber-optics plate, and wherein the collimator layer is configured to provide a narrow field-of-view (FOV) within a range of about +/−0.5° to +/−10°.

11. The apparatus of claim 1, wherein the pixelated image sensor comprises a thin-film transistor (TFT)-based organic imager.

12. The apparatus of claim 1, wherein the surface touching the transparent layer comprises a surface of a human finger.

13. A communication device comprising:
   a processor; and
   an angle-focused touch-sensing apparatus comprising:
   a light-emitting layer covered by a transparent layer and configured to illuminate a surface touching the transparent layer and to allow transmission of a reflected light from the surface to underlying layers including:
   a grating layer configured to refract the reflected light to create oblique light rays;
   an optical bending layer configured to bend the oblique light rays;
   a collimator layer including a plurality of apertures and configured to spatially process light rays received from the optical bending layer, wherein the collimator layer comprises a nontilted collimator; and
   a pixelated image sensor configured to sense the spatially processed light.

14. The communication device of claim 13, wherein the grating layer comprises a periodic structure of Fresnel prisms, and wherein the underlying layers further comprises a polarizer including a linear polarizer and one or more circular polarizers.

15. The communication device of claim 13, wherein the oblique light rays are bent at an angle of about 42° with respect to a normal to a plane of the grating layer.

16. The communication device of claim 13, wherein a collimator axis of the nontilted collimator is substantially perpendicular to the collimator layer.

17. The communication device of claim 13, wherein the optical bending layer comprises one of a planar array of blazed gratings or a holographic grating layer formed of a volume of thin-layer materials with a modulated refractive index.

18. The communication device of claim 13, wherein the light-emitting layer comprises a nonuniform illumination source configurable to generate different spatial patterns for different scans of the surface touching the transparent layer.

19. An angle-focused touch-sensing apparatus, the apparatus comprising:
   a touch-display layer including an OLED display configured to emit light to illuminate a touching surface and to transmit reflected light from the touching surface for sensing;
   an optical grating layer configured to bend the reflected light to create oblique light rays, the optical grating layer comprising Fresnel prisms;
   an optical layer comprising blazed gratings configured to rebend the oblique light rays to straight light rays;
   a collimator layer configured to collimate the straight light rays; and
   a pixelated image sensor configured to sense collimated light rays.

* * * * *